United States Patent
Ai

(10) Patent No.: US 7,018,316 B2
(45) Date of Patent: Mar. 28, 2006

(54) PLANETARY TRACTION DRIVE WITH MULTIPLE INPUTS

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 80 days.

(21) Appl. No.: 10/778,269

(22) Filed: Feb. 13, 2004

(65) Prior Publication Data

US 2004/0162175 A1    Aug. 19, 2004

Related U.S. Application Data

(60) Provisional application No. 60/448,345, filed on Feb. 18, 2003.

(51) Int. Cl.
F16H 13/06    (2006.01)
F16H 57/08    (2006.01)

(52) U.S. Cl. ........................... 475/183; 475/337

(58) Field of Classification Search ........ 475/183–197, 475/335, 337
See application file for complete search history.

(56) References Cited

U.S. PATENT DOCUMENTS

| | | | | |
|---|---|---|---|---|
| 1,400,500 A * | 12/1921 | Webb et al. | | 475/190 |
| 1,638,689 A * | 8/1927 | Farmer et al. | | 475/186 |
| 3,254,546 A * | 6/1966 | Nasvytis | | 475/183 |
| 3,367,214 A * | 2/1968 | Nasvytis | | 475/183 |
| 3,375,739 A * | 4/1968 | Nasvytis | | 475/197 |
| 3,433,099 A * | 3/1969 | Nasvytis | | 475/195 |
| 4,224,840 A * | 9/1980 | Kraus | | 476/9 |
| 4,744,261 A * | 5/1988 | Jacobson | | 475/189 |
| 4,846,008 A * | 7/1989 | Kraus | | 475/194 |
| 4,918,344 A * | 4/1990 | Chikamori et al. | | 310/83 |
| 2004/0023754 A1* | 2/2004 | Flugrad, Jr. et al. | | 476/50 |

* cited by examiner

Primary Examiner—Tisha Lewis
(74) Attorney, Agent, or Firm—Polster, Lieder, Woodruff & Lucchesi, L.C.

(57) ABSTRACT

A traction drive has inner and outer rings and drive and idler rollers organized in two rows between the rings, with the drive rollers being in an inner row and the idler rollers being in an outer row. The drive rollers contact the inner ring and the idler rollers contact the outer ring. At least one idler roller exists for every drive roller, with the idler roller and its drive roller being in contact between the two rings. Moreover, each idler roller is offset slightly circumferentially with respect to its drive roller such that the idler roller occupies a convergent space between its drive roller and the outer ring. The drive rollers rotate within an inner carrier, while the idler rollers rotate within an outer carrier and one of the carriers can rotate slightly relative to the other carrier. Each drive roller may be coupled with an electric motor. In one direction of rotation for the drive rollers, the idler rollers that are offset slightly behind the drive rollers are drawn into the convergent spaces between the drive rollers and the outer ring and this increases the contact forces between the rollers and their respective rings and between the rollers themselves. An actuator may be used to effect rotation between the carriers.

20 Claims, 7 Drawing Sheets

US 7,018,316 B2

PLANETARY TRACTION DRIVE WITH MULTIPLE INPUTS

CROSS-REFERENCE TO RELATED APPLICATIONS

This application derives and claims priority from U.S. provisional application 60/448,345, filed Feb. 18, 2003, and entitled "Self-Loading Traction Drive With Multiple Input Shafts".

STATEMENT REGARDING FEDERALLY SPONSORED RESEARCH OR DEVELOPMENT

Not Applicable.

BACKGROUND OF THE INVENTION

This invention relates in general to traction drives, and more particularly to a planetary traction drive that is suitable for multiple power inputs.

Traction drives offer several advantages of some significance over more conventional gear drives. For one, they operate more quietly. They also operate more efficiently. Apart from that, they are relatively easy to manufacture and thus are less costly to produce than gear drives. These features make traction drives attractive for marine applications.

Indeed, marine drives often require considerable power which is best derived from multiple power sources. Owing to the advantages inherent in traction drives, it is desirable to have a traction drive that has the capacity to deliver power from multiple power inputs to a single output.

DETAILED DESCRIPTION OF THE INVENTION

Figure 1:
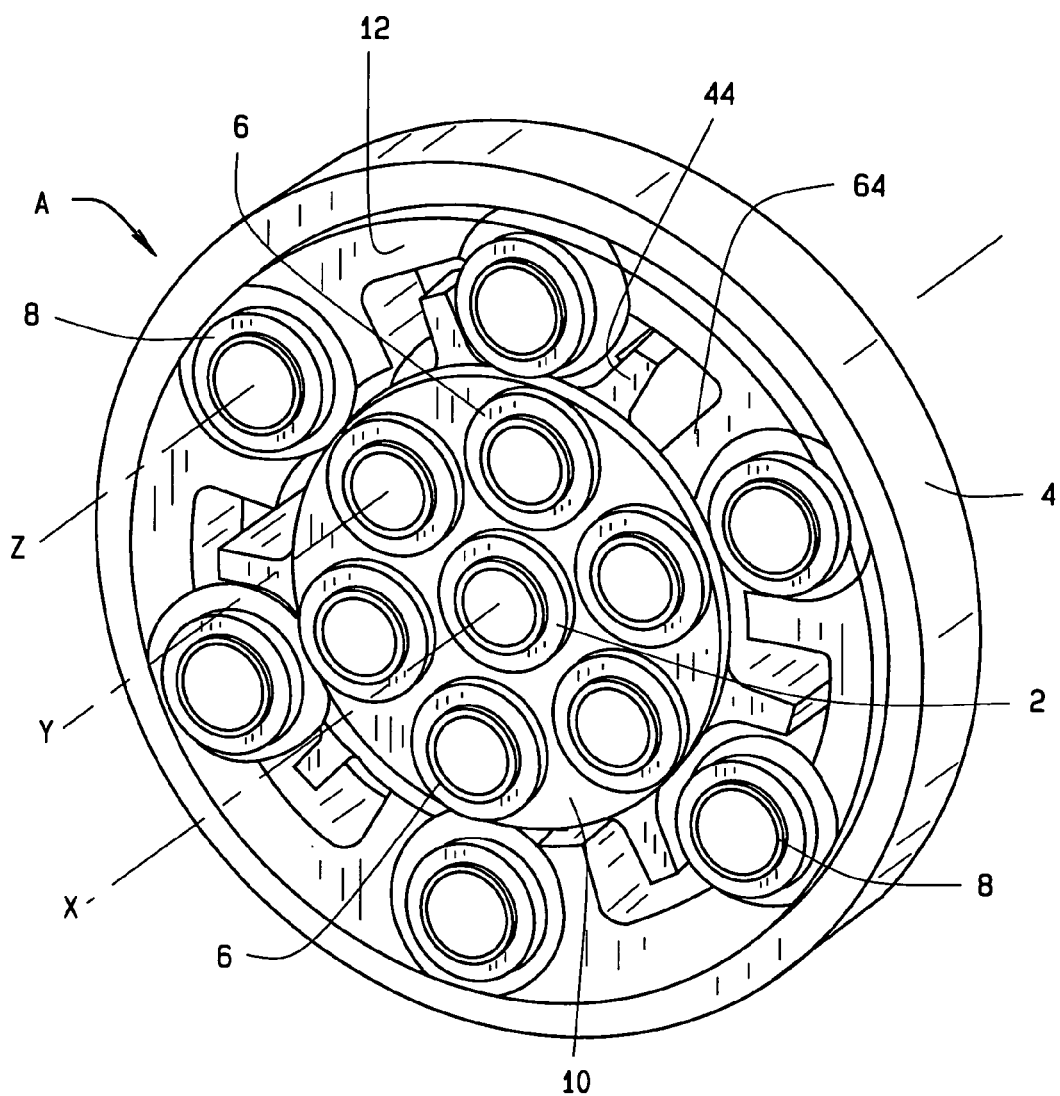
FIG. 1 is a perspective view of a traction drive constructed in accordance with and embodying the present invention.
Figure 2:
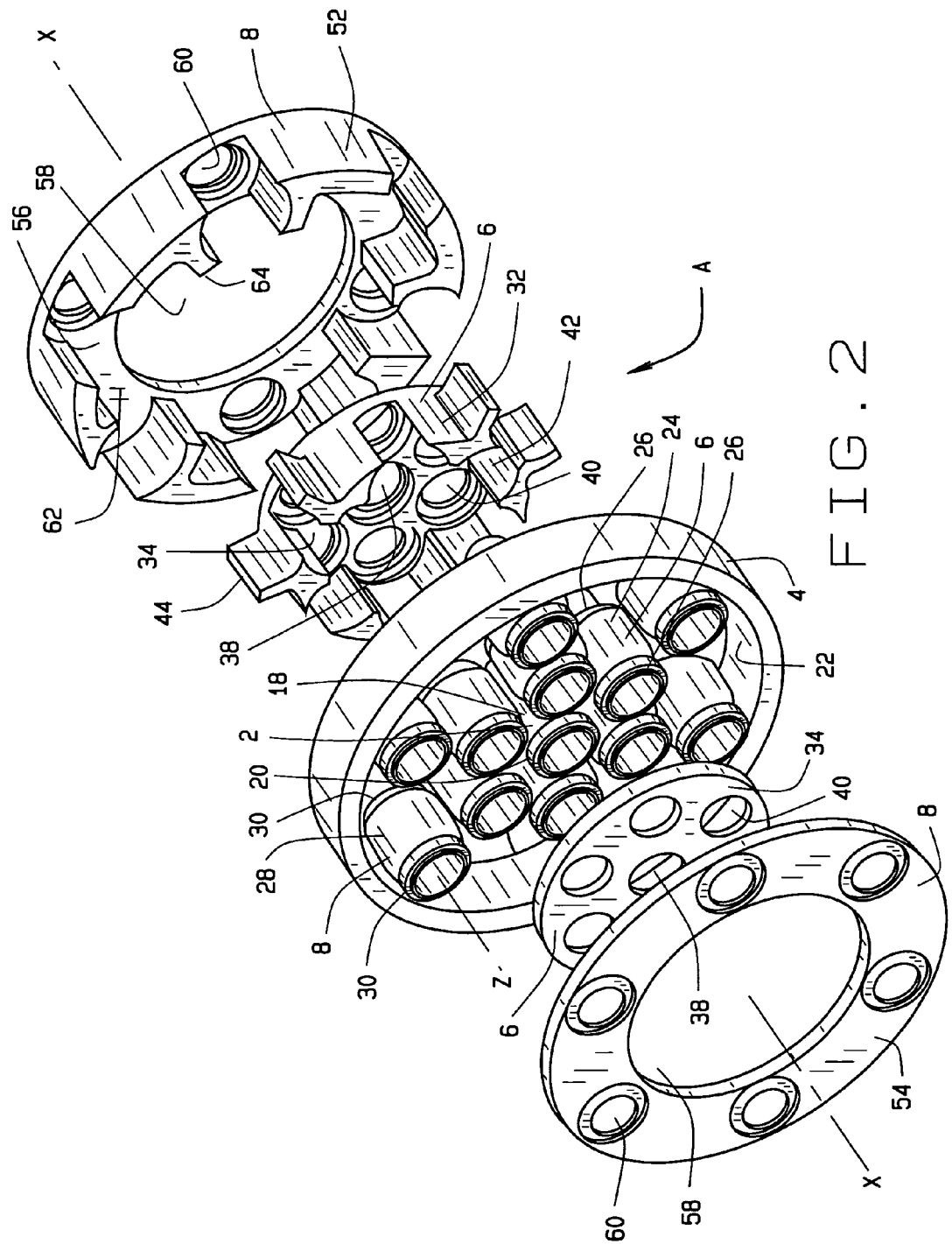
FIG. 2 is an exploded perspective view of the traction drive.

Referring now to the drawings, a traction drive A (FIGS. 1–3), which is organized about an axis X as a planetary system, includes an inner ring 2, an outer ring 4, and two sets of planetary rollers organized in inner and outer rows between the inner and outer rings 2 and 4, there being drive rollers 6 in the inner row and idler rollers 8 in the outer row. In addition, the traction drive A has an inner carrier 10 for the rollers 6 of the inner row and an outer carrier 12 for the rollers 8 of the outer row, the former being located generally within the latter.

The inner ring 2 lies along the axis X and has (FIG. 2) a cylindrical raceway 18 which is presented outwardly away from the axis X and journals 20 which project beyond the ends of raceway 18. The raceway 18 and journals 20 have a common center that is coincident with the axis X.

The outer ring 4 surrounds the inner ring 2 and has (FIG. 2) a cylindrical raceway 22 that is presented inwardly toward the axis X and toward the raceway 18 of the inner ring 2. It too has its center coincident with the axis X. The raceway 22 is spaced sufficiently from the raceway 18 to accommodate the drive and idler rollers 6 and 8 of the two rows as well as the carriers 10 and 12.

Figure 3:
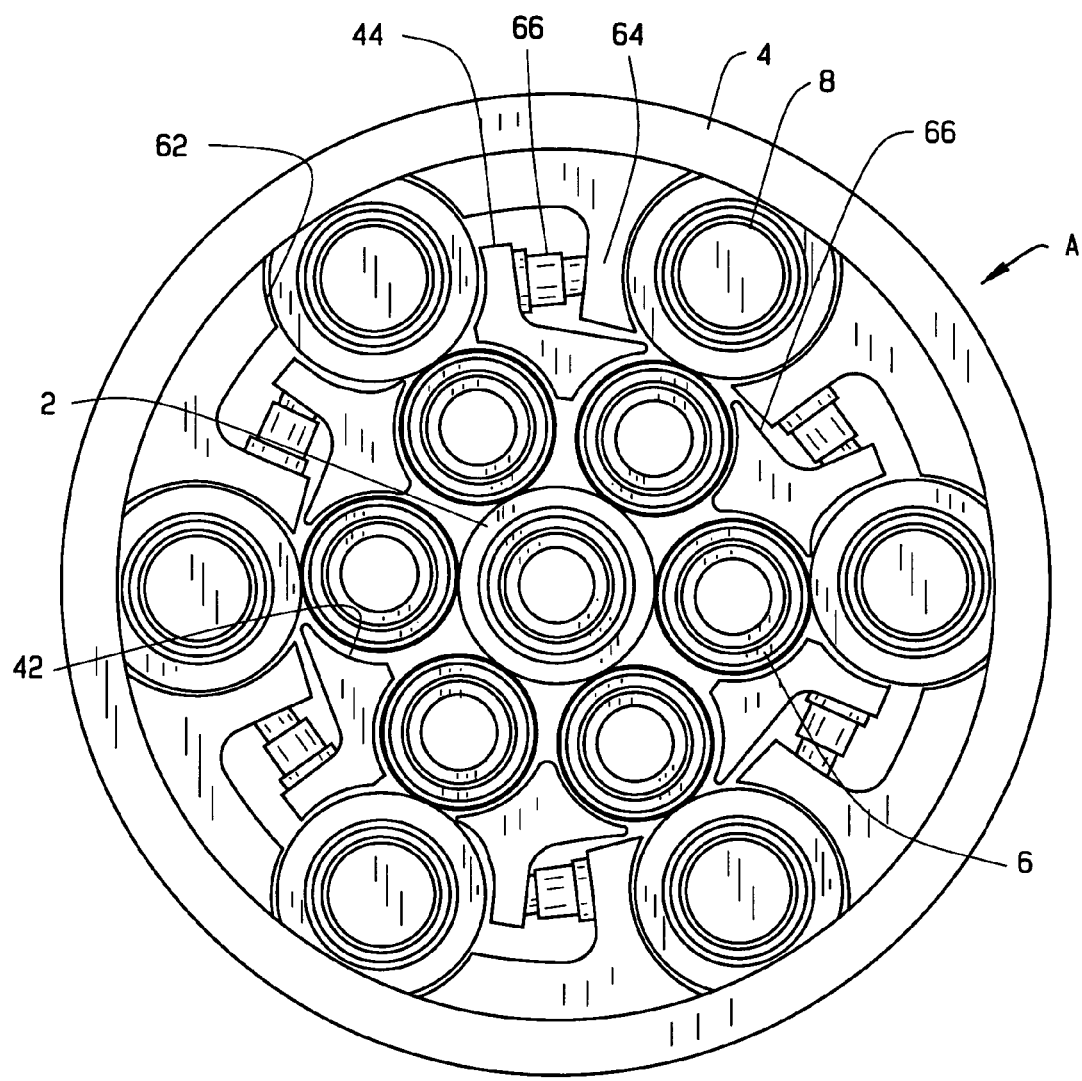
FIG. 3 is an end view of the traction drive with the end plates of its carrier removed.

Each drive roller 6 of the inner row has (FIG. 2) a cylindrical friction surface 24 and journals 26 of reduced diameter projecting beyond the ends of its friction surface 24, with the friction surface 24 and journals 26 being concentric. The drive rollers 6 are equal in size and revolve about axes Y that lie parallel to the center axis X. Their friction surfaces 24 contact the raceway 18 of the inner ring 2 (FIG. 3).

Figure 4:
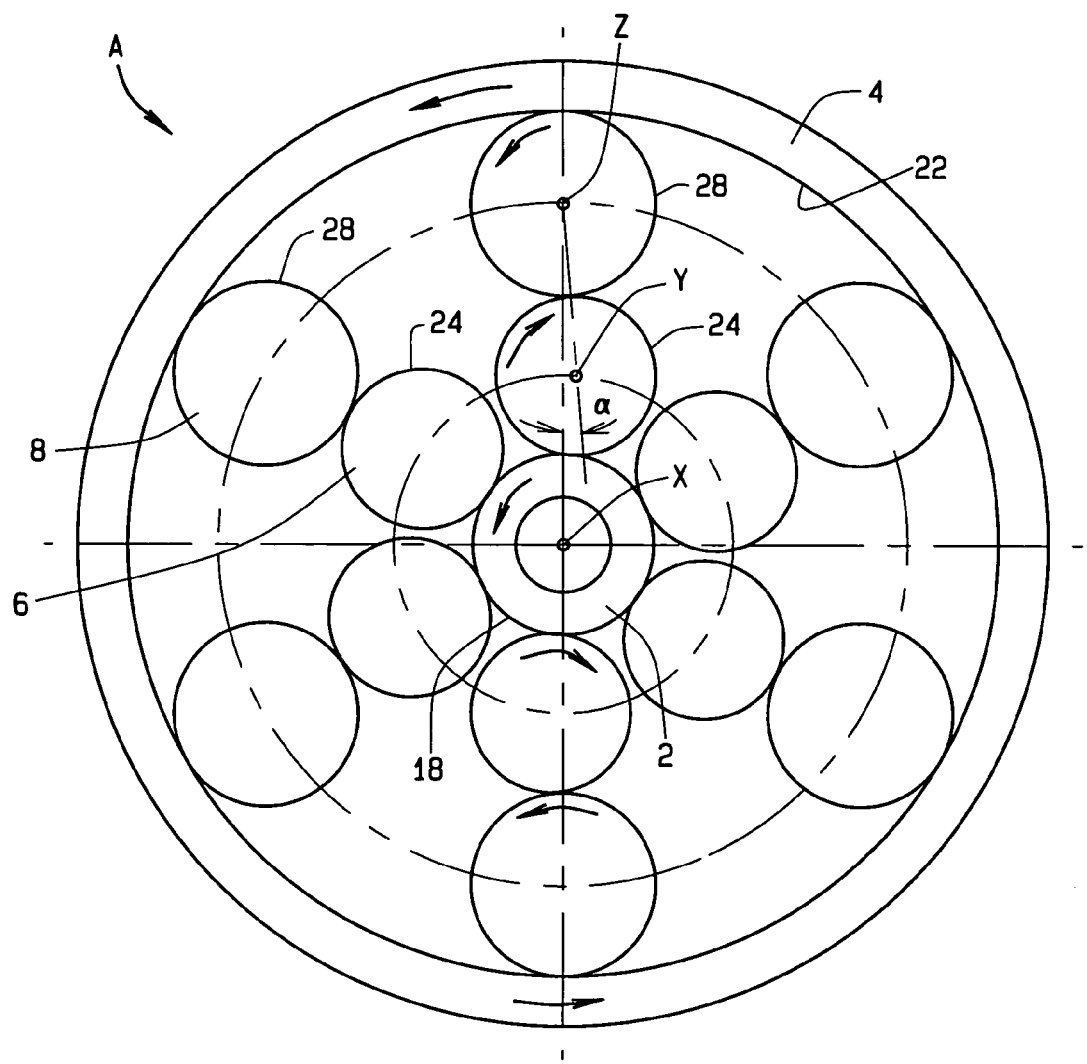
FIG. 4 is a schematic sectional view of the drive.

Each idler roller 8 of the outer row likewise has (FIG. 2) a cylindrical friction surface 28 and journals 30 projecting beyond the ends of its friction surface 28, with the journals 30 and friction surface 28 being concentric. A separate idler roller 8 exists for each drive roller 6, and its friction surface 28 contacts the friction surface 24 for the drive roller 6 which corresponds to it and also contacts the raceway 22 of the outer ring 4 (FIG. 4). The diameter of the friction surfaces 28 for each idler roller 8 exceeds the minimum distance between the friction surface 22 of the outer ring 4 and the friction surface 24 of the drive roller 6. Thus, the outer rollers 8 are offset slightly circumferentially with respect to their respective drive rollers 6 so that convergent spaces exist between the friction surfaces 24 of the drive rollers 6 and the raceway 22 of the outer ring 4. This enables the idler rollers 8 to lodge between their respective drive rollers 6 and the outer ring 2, and here they rotate about axes Z which are also parallel to the center axis X. Therefore, the axes Y and Z of corresponding drive and idler rollers 6 and 8 do not align along radii emanating from the axis X, but instead are offset by an angle a, that is to say, for any two rollers 6 and 8 an angle a exists between a line connecting the center axis X and the axis Z of the roller 8 and a line connecting the axes Y and Z for the two rollers 6 and 8.

The inner carrier 10 holds the drive rollers 6, serving to position the rollers 6 at equal circumferential intervals around axis X. It includes (FIG. 2) a body 32 and an end plate 34 fitted securely to the body 32. The body 32 has an end wall 36 provided with a single center opening 38 and a plurality of offset openings 40 arranged at equal circumferential intervals around the center opening 38. The end plate 34 likewise has a center opening 38 and surrounding openings 40 which align with their counterparts in the end wall 36 of the body 32. Between the multiple openings 40 in its end wall 36 the body 32 contains pockets 42 which receive the drive rollers 6—actually, the portions of the rollers 6 on which the friction surfaces 24 reside. The journals 26 for the drive rollers 6, on the other hand, fit into the multiple openings 40 in the end plate 34 and end wall 36, with the openings 40 serving as bearings for the journals 26. The center openings 38 in the end plate 34 and end wall 36 receive the journals 20 on the inner ring 2 and serve as bearings for the journals 20. The arrangement is such that the inner ring 2 and drive rollers 6 lie captured with the inner carrier 10, with the raceway 18 of the inner ring 2 being against the friction surfaces 24 on the drive rollers 6. Finally, the inner carrier 10 has ribs 44 which project outwardly into the outer carriers 12.

The outer carrier 12 likewise has (FIG. 2) a body 52 and an end plate 54. The body 52 has an end wall 56 provided with a large central opening 58 and surrounding smaller openings 60. It also has pockets 62 at the smaller openings 60. The end plate 54 likewise has a large central opening 58 and surrounding smaller openings 60 which align with their counterparts in the end wall 56. The pockets 62 receive the portions of the outer rollers 8 around which the cylindrical friction surfaces 28 extend, while the smaller openings 60 in the end plate 54 and end wall 56 receive the journals 30 on the rollers 8 and serve as bearings for the journals 30. The large center openings 58 in the end plate 54 and end wall 56 receive the ends of the inner carrier 10, so that the end plate 34 of the inner carrier 10 lies within the end plate 54 of the outer carrier 12, and the end wall 56 on the body 32 of the inner carrier 10 lies within the end wall 56 of the body 52 for the outer carrier 12. Finally, the body 52 of the outer carrier 12 has between it pockets 62 inwardly directed ribs 64 which are offset circumferentially from the outwardly directed ribs 44 on the inner carrier 10.

Thus, the inner carrier 10 captures the drive rollers 6 such that they are organized at equal circumferential intervals around the axis X. It also captures the inner ring 2 with its cylindrical raceway 18 bearing against the cylindrical friction surfaces 24 on the drive rollers 6. The outer carrier 12 captures the idler rollers 8 such that their cylindrical friction surfaces 28 bear against both the cylindrical raceway 22 on the outer ring 4 and the cylindrical friction surfaces 24 on the drive rollers 6. The outer carrier 12 can rotate a limited amount relative to the inner carrier 10, and thus floats relative to the inner carrier 12. In one direction of rotation the idler rollers 8 lodge tightly between the outer ring 4 and the drive rollers 6 which in turn are backed by the inner ring 2. In the other direction of rotation the ribs 64 on the outer carrier 12 interfere with the ribs 44 on the inner carrier 10 and that restricts further rotation in that direction.

Between the inwardly directed ribs 64 of the outer carrier 12 and the outwardly directed ribs 44 of the inner carrier 10 are actuators 66 (FIG. 3). Some of the ribs 64 and 44 are positioned such that, when the actuators 66 between them are energized, those actuators 66 rotate the outer carrier 12 relative to the inner carrier in the direction that urges the idler rollers 8 into the convergent spaces between the drive rollers 6 and the outer ring 4. The remaining ribs 64 and 44 are positioned such that, when energized, they will rotate the outer carrier 12 in the opposite direction, thereby moving the idler rollers 8 out of the convergent spaces between the drive rollers 6 and outer ring 4. The actuators 66 may be purely mechanical, such as lever-operated or spring-loaded devices, or they may be electrically operated or hydraulically operated or even hybrids.

Each of the drive rollers 6 may be coupled to an electric motor for transferring power from multiple sources into the traction drive A. The power may be taken from the drive A at the outer ring 4 with an increase in torque and a decrease in angular velocity. In that event, the inner carrier 10 is fixed against rotation, while the inner ring 2 rotates as an idler and the outer carrier 12 floats relative to the inner carrier 10. The traction drive A transmits power in both directions of rotation, but primarily in one direction—a so-called forward direction. In the forward direction (FIG. 3) each powered drive roller 6 rotates such that it pulls its corresponding idler roller 8 into the convergent gap between it and the outer ring 4 although the movement may be assisted by energizing the appropriate actuators 66. A torque-responsive normal contact force develops between the friction surface 28 of each idler roller 8 and the raceway 22 of the outer ring 4 and also between the friction surface 28 of that idler roller 8 and the friction surface 24 of the corresponding drive roller 6. The inner ring 2 serves as a backing for the drive rollers 6 and resists the inwardly directed forces applied to them. As the driving torque increases the normal contact forces likewise increase, providing all the more tractive effort. To insure that adequate tractive forces exist when the power is supplied through the drive rollers 6, the following relationship should exist:

$$\tan\frac{\alpha}{2} \leq \mu,$$

where $\mu$ is the coefficient of friction at the contacts between the rollers 6 and 8 and between the idler rollers 8 and the outer ring 4. In the reverse direction, the drive rollers 6 rotate in the opposite direction and seek to displace the idler rollers 8 from the convergent gaps between the drive rollers 6 and the outer ring 4. In order to maintain adequate contact forces between the corresponding rollers 6 and 8 and likewise between the rollers 8 and the outer ring 4, the same actuators 66 may be again energized to apply torque to the outer floating carrier 12 in the direction which causes the idler rollers 8 to move into the convergent gaps between the drive rollers 6 and the outer ring 4. The torque exerted on the floating carrier 12 by the actuators 66 may be adjusted to provide adequate normal contact forces. Variations are possible. For example, the power may be applied through the rollers 8 of the outer row, in which event the rollers 6 of the inner row function as idlers. Also, instead of the inner ring 2 serving as an idler, the power may be taken from it, in which event the outer ring 4 becomes the idler. Moreover, the outer carrier 12 may be fixed and the inner carrier 10 may float.

A modified traction drive B (FIGS. 5–9), which is organized about an axis S, likewise includes an inner ring 72, an outer ring 74 around the inner ring 72, and inner and outer planet rollers in the form of drive rollers 76 and idler rollers 78 between the two rings 72 and 74, with the former being in a row along the inner ring 72 and the latter being in another row along the outer ring 74. In addition, the drive B has a floating inner carrier 80 in which the drive rollers 76 rotate and a fixed outer carrier 82 in which the idler rollers 78 rotate. Finally, the drive B is provided with electric motors 84 (FIG. 5) which are carried by the floating carrier 80 and are coupled to the drive rollers 76, there being a pair of motors 84 for each drive roller 76.

The inner ring 72 lies within the floating carrier 80 where it serves to position and back the drive rollers 76, but otherwise functions merely as an idler. It has (FIG. 5) a cylindrical raceway 88 along which the drive rollers 76 roll. The axial centerline of the raceway 88 corresponds to the axis S.

The outer ring 74 delivers the power that is transferred through the drive B, which power is produced by the motors 84. It has two (FIG. 6) tapered raceways 90 separated by an intervening cylindrical raceway 92. All three have their axial centerlines coincident with the axis S. The two tapered raceways 90 taper downwardly away from the intervening raceway 92 so that their largest diameters are along the sides of the intervening surface 90. They lie within conical envelopes having their apices along the axis S. Between the intervening raceway 92 and each tapered raceway 90, the outer ring 74 has an annular groove 94 which opens inwardly toward the axis S.

Figure 9:
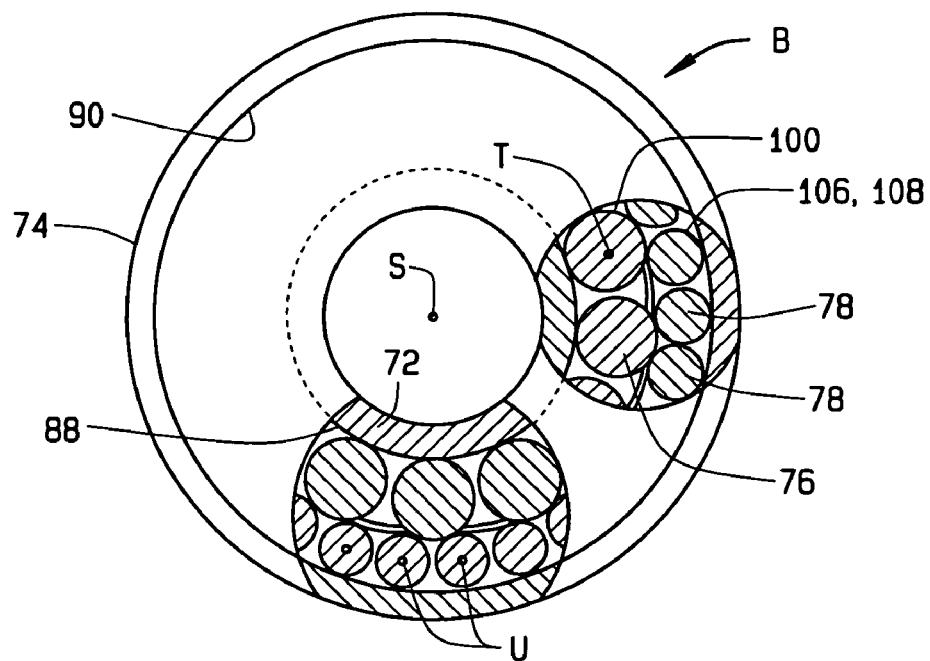
FIG. 9 is a schematic sectional view of the modified traction drive of FIG. 5.

Each drive roller 76 has (FIG. 7) a cylindrical friction surface 100 and journals 102 located beyond the ends of the friction surface 100 to enable the roller 76 to rotate about an axis T that lies parallel to, yet is offset from, the axis S. The drive rollers 76 along their cylindrical friction surfaces 100 contact the inner ring 72 at its raceway 88 (FIG. 9). The floating carrier 80 provides bearings for the journals 102, and indeed the journals 102 rotate in the floating carrier 80 where each is coupled to one of the electric motors 84.

Each idler roller 78 has (FIG. 8) a cylindrical friction surface 106 and a separate spherical surface 108 at each end of the cylindrical surface 106. The two spherical surfaces 108 tapered downwardly away from the cylindrical surface 106, yet the cylindrical surface 106 lies slightly depressed between the two spherical surfaces 108 so as to form a groove between the spherical surfaces 108 with shoulders 110 at the ends of the groove. Apart from that, each idler roller 78 has journals 112 which project axially beyond its spherical surfaces 108 and into the fixed carrier 82 which provides bearings for them, thus enabling the idler roller 78 to rotate in the carrier 82 about an axis U. The cylindrical surface 106, the spherical surfaces 108, and the journals 112 of each idler roller 78 have their centers along the axis U for the rollers 78. The axes U for the several idler rollers 78 lie parallel to, yet are offset circumferentially from, the axes T of the drive rollers 76.

Figure 5:
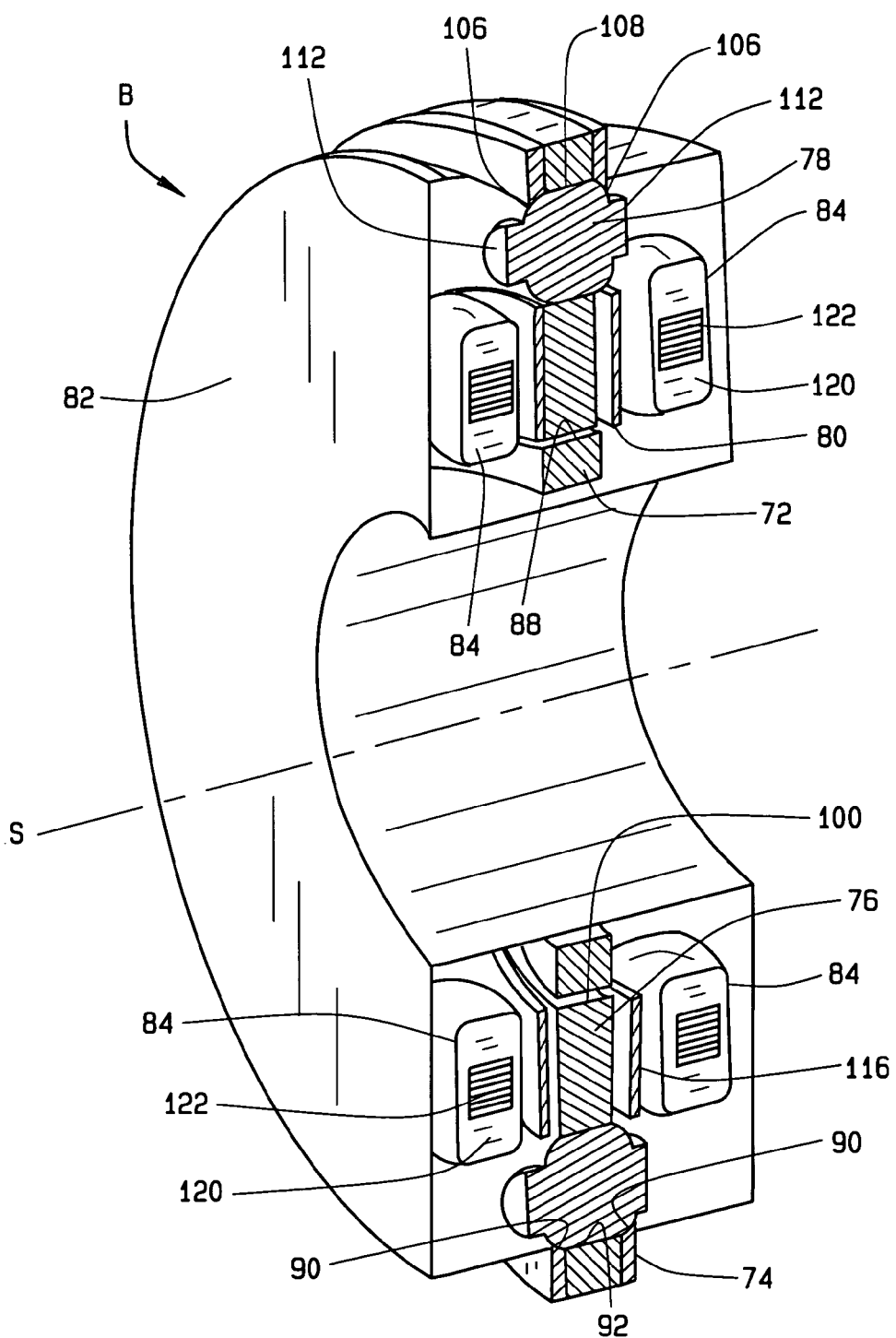
FIG. 5 is a perspective view, partially broken away and in section, of a modified traction drive constructed in accordance with and embodying the present invention.
Figure 6:
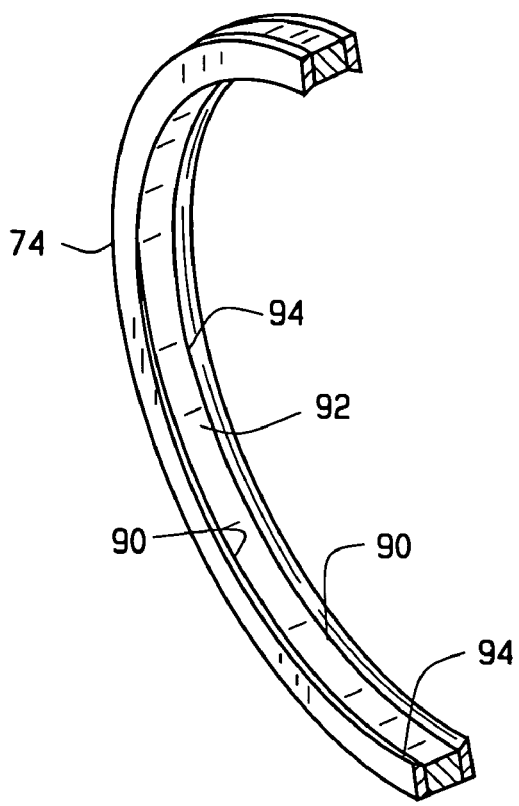
FIG. 6 is a perspective view, partially broken away and in section, of an outer ring forming part of the modified traction drive of FIG. 5.
Figure 7:
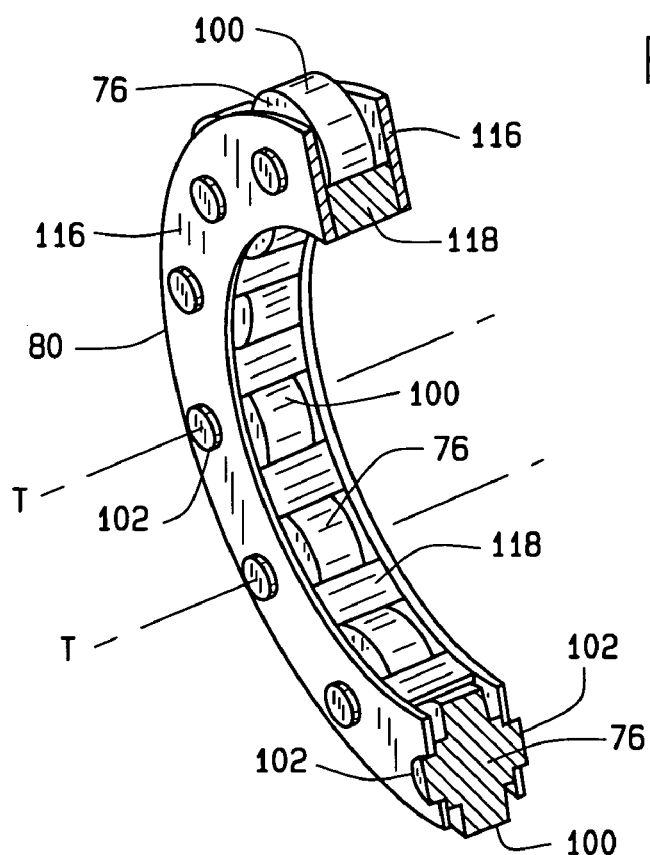
FIG. 7 is a perspective view, partially broken away and in section, of a floating inner carrier and drive rollers all forming part of the modified traction drive of FIG. 5.
Figure 8:
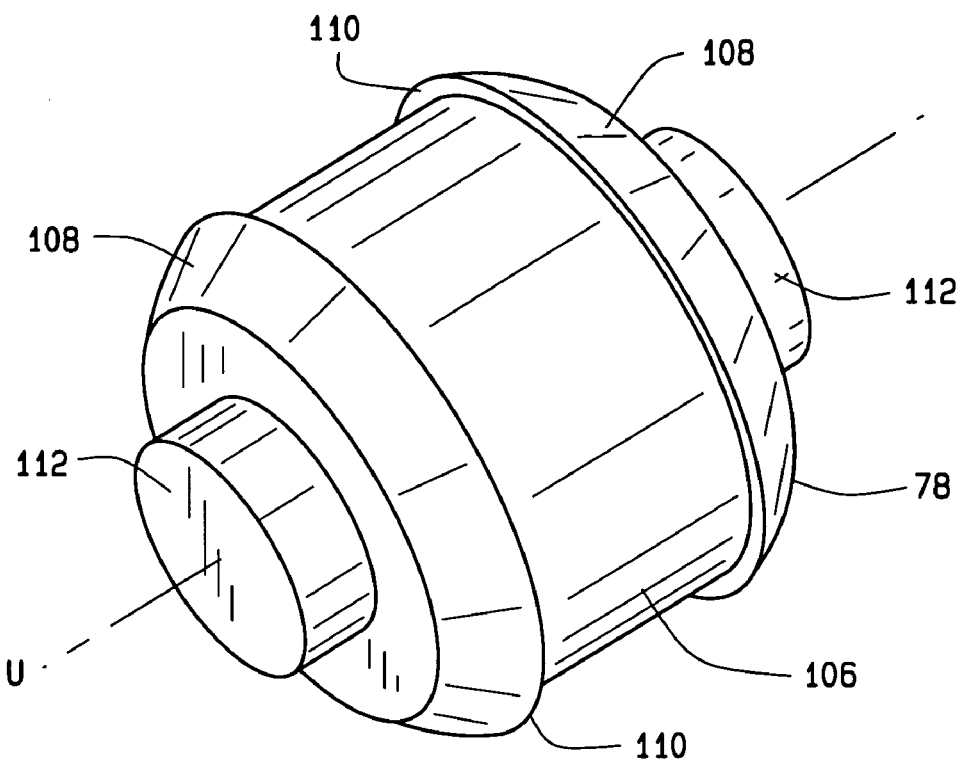
FIG. 8 is a perspective view of one of the idler rollers for the modified traction drive of FIG. 5.

The idler rollers 78 along their cylindrical friction surfaces 100 bear against the cylindrical friction surfaces 100 of the drive rollers 76, and also along the cylindrical raceway 92 of the outer ring 74. The spherical friction surfaces 108 of the idler rollers 78 bear against the tapered raceways 90 of the outer rings 74 (FIGS. 5 & 9). The grooves formed by the depressed cylindrical surfaces 106 of the idler rollers 78 receive the drive rollers 76 so that the shoulders 110 on the idler rollers 78 lie along the sides of the drive rollers 76, thus insuring that the idler rollers 78 remain around the drive rollers 76. The grooves 94 in the outer ring 74, on the other hand, receive the edges formed on the outer rollers 78 by the intersection of the spherical surfaces 108 and the shoulders 110. Any radially directed force at the contact between the outer ring 74 and an idler roller 78 is transferred through the cylindrical raceway 92 and friction surface 106, whereas any axially directed force is transfigured through the tapered raceways 90 and spherical friction surfaces 108.

The fixed carrier 82 contains the inner ring 72, the drive rollers 76, and the outer ring 74, as well as the floating carrier 80 and the electric motors 84. To hold the drive rollers 76 in place around the inner ring 72, the floating carrier 80 has (FIG. 7) side walls 116 between which the enlarged portions of the rollers 76 fit, that is to say the portions which carry the cylindrical friction surfaces 100. The side walls 116 provide bearings for the journals 102 which project into and rotate in those side walls 116. The floating carrier 80 also has bridges 118 which connect the side walls 116 between the rollers 76 such that the cylindrical friction surfaces 100 on the rollers 76 are exposed beyond the inner and outer edges of the side walls 116. The floating carrier 80 fits within the fixed carrier 82, and while it is confined axially by the fixed carrier 82, it can rotate through a small arc to and fro with respect to the fixed carrier 80.

The fixed carrier 82 contains bearings which receive the journals 112 on the idler rollers 78, and thus position the idler rollers 78 at prescribed circumferential intervals. Those intervals are such that for every drive roller 76 in the floating carrier 80, a pair of idler rollers 78 exist in the fixed carrier 82, and these idler rollers 78 straddle the drive roller 76 with a slight clearance (FIG. 9). When the floating carrier 80 is urged in one direction of rotation, each drive roller 76 will come against one idler roller 78 of the pair identified with it, and that idler roller 78 will prevent further rotation of the floating carrier 80 in that direction, and when urged in the other direction of rotation, the drive roller 76 will come against the other idler roller 78 of the pair and that idler roller 78 will prevent further rotation in that other direction. Thus, the idler rollers 78 of each pair lie in convergent gaps between the drive roller 76 for the pair and the outer ring 74 and are offset circumferentially with respect to the driver roller 76.

The motors 84 fit within the fixed carrier 82 but are carried by the floating carrier 80. Each includes (FIG. 5) a stator 120 and a rotor 122 which rotates within the stator 120. The stators 120 are secured to the floating carrier 80, while the rotors 122 are coupled to the journals 102 on the inner rollers 76. Each journal 102 has a rotor 122 coupled to it, so each inner roller 76 is powered by two motors 84.

In the operation of the traction drive B, the motors 84 apply torque to and rotate the drive rollers 76, all in the same direction (FIG. 9). That direction, in effect, will draw one of the idler rollers 78 for each drive roller 76 farther into the convergent gap between the inner roller 76 and the outer ring 74, thereby increasing the normal contact forces between the idler rollers 78 and the drive rollers 76 at the cylindrical friction surfaces 100 and 106 and between the idler rollers 78 and the outer ring 74 at the cylindrical friction surfaces 106 and the cylindrical raceway 92. The tapered raceways 90 of the outer ring 74 lie along the spherical surfaces 108 at the idler rollers 78 and confine the idler rollers 78 axially, whereas the shoulders 110 of the idler rollers 78 confine the drive rollers 76 axially. The greater the torque demanded of the motors 84, the greater the contact forces between the drive rollers 76 and the idler rollers 78 and between the idler rollers 78 and the outer ring 74. Should the motors 84 rotate the inner rollers 76 in the opposite direction, each inner roller 76 will transfer its share of the torque to the outer ring 74 through the other idler roller 78 of the pair which straddles it. Thus, those other idler rollers 78 will lodge tightly between the inner rollers 76 and the outer ring 74. The floating carrier 80, owing to its capacity to rotate slightly relative to the fixed carrier 82, permits the transfer of torque between either of the idler rollers 78 of each pair and thus accommodates the change in direction. An actuator may be coupled between the carriers 80 and 82 to initiate and support the contact in either direction between the drive rollers 76 and idler rollers 78.

| PLANETARY TRACTION DRIVE WITH MULTIPLE INPUTS | |
|---|---|
| A | traction Drive |
| B | modified traction drive |
| X | axis |
| Y | axis |
| Z | axis |
| S | axis |
| T | axis |
| U | axis |
| 2 | inner ring |

-continued

PLANETARY TRACTION DRIVE WITH MULTIPLE INPUTS

| | |
|---|---|
| 4 | outer ring |
| 6 | drive rollers |
| 8 | idler rollers |
| 10 | inner carrier |
| 12 | outer carrier |
| 18 | raceway |
| 20 | journals |
| 22 | raceway |
| 24 | friction surfaces |
| 26 | journals |
| 28 | friction surface |
| 30 | journals |
| 32 | body |
| 34 | end plate |
| 36 | end wall' |
| 38 | center opening |
| 40 | offset openings |
| 42 | pockets |
| 44 | ribs |
| 52 | body |
| 54 | end plate |
| 56 | end wall |
| 58 | center opening |
| 60 | smaller openings |
| 62 | pockets |
| 64 | ribs |
| 66 | actuators |
| 72 | inner ring |
| 74 | outer ring |
| 76 | drive rollers |
| 78 | idler rollers |
| 80 | inner carrier |
| 82 | outer carrier |
| 84 | electric motors |
| 88 | cylindrical raceway |
| 90 | tapered raceways |
| 92 | intervening raceway |
| 94 | grooves |
| 96 | |
| 100 | friction surface |
| 102 | journals |
| 104 | |
| 106 | cylindrical surface |
| 108 | spherical surface |
| 110 | shoulders |
| 112 | journals |
| 144 | |
| 116 | side walls |
| 118 | bridges |
| 120 | slator |
| 122 | rotor |

What is claimed is:

1. A traction drive organized about a center axis and comprising:
an inner ring having a raceway that is presented away from the axis;
an outer ring having a raceway that is presented inwardly toward the axes;
first rollers located between the inner and outer rings and contacting the raceway of the inner ring;
second rollers located between the inner and outer rings and contacting the raceway of the outer ring and the first rollers, there being at least one second roller for each first roller, with the second roller being offset slightly circumferentially with respect to its first roller so that the second roller occupies a convergent space between its first roller and the raceway of the outer ring;
a first carrier in which the first rollers are received; and
a second carrier in which the second rollers are received; one of the carriers being rotatable about the center axis slightly with respect to the other carrier so as to allow a circumferential displacement between the first and second rollers.

2. A traction drive according to claim 1 wherein the raceway of the inner ring is cylindrical and each first roller has a cylindrical friction surface which contacts the cylindrical raceway of the inner ring.

3. A traction drive according to claim 2 wherein the raceway of the outer ring is cylindrical and each second roller has a cylindrical friction surface which contacts the cylindrical raceway of the outer ring and the cylindrical friction surface of its first roller.

4. A traction drive according to claim 1 wherein the first rollers have journals and the first carrier receives the journals such that the first rollers can rotate in the first carrier.

5. A traction drive according to claim 4 wherein the second rollers have journals and the second carrier receives the journals of the second rollers such that the second rollers can rotate in the second carrier.

6. A traction drive according to claim 1 wherein the outer ring has two raceways which are tapered in opposite directions and an intervening raceway between the tapered raceways, and each second roller has two tapered friction surfaces which contact the tapered raceways of the outer ring.

7. A traction drive according to claim 6 wherein each second roller has an intervening friction surface located between its tapered friction surfaces, and the intervening friction surface contacts the first roller for that second roller and also the intervening raceway of the outer ring.

8. A traction drive according to claim 7 wherein the intervening friction surface for each second roller lies within an annular groove that is between the tapered friction surfaces for the roller; and the first roller for that second roller along its periphery is received in the groove.

9. A traction drive according to claim 8 wherein the intervening raceway of the outer ring is cylindrical, wherein the intervening friction surface of each second roller is cylindrical; and wherein each first roller has a cylindrical friction surface along which it contacts the intervening friction surface of its second roller.

10. A traction drive according to claim 1 and further comprising an actuator connected to one of the carriers for rotating that carrier relative to the other carrier.

11. A traction drive according to claim 1 and further comprising motors coupled to the first rollers.

12. A traction drive according to claim 1 wherein each first roller has journals projecting from its ends, and the journals are received in the first carrier such that the first rollers can rotate in the first carrier, and further comprising electric motors carried to the first carrier and coupled to the journals of the first rollers.

13. A traction drive according to claim 1 wherein there is a pair of second rollers for each first roller, and the second rollers of each pair straddle their first roller.

14. A traction drive organized about a center axis and comprising:
an inner ring having a raceway that is presented outwardly away from the axis;
an outer ring surrounding the inner ring and having at least one raceway that is presented inwardly generally toward the axis;
drive rollers arranged in a row around the inner ring and having friction surfaces along which they contact the raceway of the inner ring;

idler rollers organized in a row generally between the drive rollers and the raceway of the outer ring, and having friction surfaces along which they contact the raceway of the outer ring and the friction surfaces of the drive rollers, there being at least one idler roller for each drive roller, with the idler roller being offset slightly circumferentially with respect to its drive roller such that it is located in a convergent space between its drive roller and the outer ring;

a first carrier receiving the drive rollers and positioning them at prescribed circumferential intervals;

a second carrier receiving the idler rollers and positioning them at prescribed circumferential intervals with their axes offset circumferentially from the axes of the drive rollers.

15. A traction drive according to claim 14 and further comprising motors carried by the fixed carrier and coupled with the drive rollers for rotating the drive rollers.

16. A traction drive according to claim 14 wherein the drive rollers have journals at their ends and the journals are received in and rotate in the first carrier; and wherein the idler rollers have journals at their ends and the journals of the idler rollers are received in and rotate in the second carrier.

17. A traction drive according to claim 14 wherein the idler rollers are arranged in pairs, there being for each drive rollers two idler roller that straddle the drive roller, so that one idler roller will be drawn into the convergent space between its drive roller and outer ring in one direction of rotation and the other idler roller will be drawn into the convergent space between its drive roller and the outer ring in the opposite direction of rotation.

18. A traction drive according to claim 14 wherein the outer ring has a pair of raceways which taper in opposite directions and each idler roller has a pair of tapered friction surfaces along which it contacts the tapered raceways of the outer ring and also an intervening friction surface located between the tapered friction surfaces, each idler rollers contacting the friction surface of its drive roller along its intervening raceway.

19. A traction drive according to claim 14 wherein one of the carriers is a floating carrier that is rotatable relative to the other carrier which is a fixed carrier.

20. A traction drive according to claim 19 and further comprising an actuator connected to the floating carrier for rotating the floating carrier relative to the fixed carrier and urging the idler rollers into the convergent spaces between the drive rollers and the outer ring.

* * * * *